US012117220B2

(12) United States Patent
Pizzo et al.

(10) Patent No.: US 12,117,220 B2
(45) Date of Patent: Oct. 15, 2024

(54) REGULATION METHOD AND REGULATION APPARATUS OF A REFRIGERATION PLANT AND RESPECTIVE REFRIGERATION PLANT INCLUDING SUCH APPARATUS

(71) Applicant: Carel Industries S.p.A., Brugine (IT)

(72) Inventors: Filippo Pizzo, Brugine (IT); Matteo Dal Corso, Brugine (IT); Dimitry Renesto, Brugine (IT)

(73) Assignee: CAREL INDUSTRIES S.P.A., Brugine (IT)

( * ) Notice: Subject to any disclaimer, the term of this patent is extended or adjusted under 35 U.S.C. 154(b) by 0 days.

(21) Appl. No.: 17/933,890

(22) Filed: Sep. 21, 2022

(65) Prior Publication Data

US 2023/0092474 A1 Mar. 23, 2023

(30) Foreign Application Priority Data

Sep. 23, 2021 (IT) .......................... 102021000024490

(51) Int. Cl.
*F25B 49/02* (2006.01)
*F25B 5/02* (2006.01)

(52) U.S. Cl.
CPC .............. *F25B 49/022* (2013.01); *F25B 5/02* (2013.01); *F25B 2400/077* (2013.01); *F25B 2500/15* (2013.01); *F25B 2500/19* (2013.01); *F25B 2700/193* (2013.01)

(58) Field of Classification Search
CPC .... F25B 49/022; F25B 5/02; F25B 2400/077; F25B 2500/15; F25B 2500/19; F25B 2700/193
See application file for complete search history.

(56) References Cited

U.S. PATENT DOCUMENTS 7,000,413 B2\* 2/2006 Chen ....................... F25B 9/008
62/190
11,428,447 B2\* 8/2022 Renesto .................. F25B 9/008

\* cited by examiner

*Primary Examiner* — Nael N Babaa
(74) *Attorney, Agent, or Firm* — LUCAS & MERCANTI, LLP (57) ABSTRACT

Described is a regulation apparatus for a refrigeration plant having defined therein a refrigerant fluid path and a plurality of devices arranged along the refrigerant fluid path. The regulation apparatus includes a first sensor arranged in a first point (P1), and preferably a second sensor arranged in a second point (P3), both along the refrigerant fluid path. The control unit controls a first value measured by the first sensor and obtains a first regulation request of a device deriving from the first measured value as well as a second value measured by the second sensor, or calculated for the second point, and derives a second regulation request of the device deriving from the second measured value, compares the first and second regulation requests and establishes which regulation request is greater. A control unit commands an actuation device to actuate the most effective regulation request of the refrigeration plant devices.

24 Claims, 6 Drawing Sheets

REGULATION METHOD AND REGULATION APPARATUS OF A REFRIGERATION PLANT AND RESPECTIVE REFRIGERATION PLANT INCLUDING SUCH APPARATUS

CROSS REFERENCE TO RELATED APPLICATIONS

This application claims the benefit of priority from Italian Patent Application No. 102021000024490, filed Sep. 23, 2021, the contents of which are incorporated herein by reference.

FIELD OF THE INVENTION

This invention relates in general to the technical sector of a refrigeration plant, such as for example a refrigeration, air conditioning or heat pump pant. More specifically, the invention relates to a regulation method and a corresponding regulation apparatus for said refrigeration plant, as well as a refrigeration plant which includes, or which is associated with, said regulation apparatus.

According to the invention, the term refrigeration plant means a pant such as those indicated above which includes at least one compression device, a heat exchanger, at least one lamination unit and an evaporator.

BACKGROUND OF THE INVENTION

It is known that such a refrigeration plant is subject to numerous continuous changes due to changes in the conditions external to the plant, which can determine significant variations in the toad and power required for optimal operation. It follows that the performance of such a type of plant depends decisively on its dynamic behaviour. In particular, a high regulation quality with constant power control is required in the presence of large load variations.

For this purpose, it is known to provide a so-called regulation device arranged on a single device to control a physical quantity (pressure, temperature, humidity, flow rate, etc.) with the aim of modifying the operation of said device in feedback if the value of said physical quantity deviates from a predetermined reference value.

In particular, in the feedback controls, using suitable formulas, the input quantity to be controlled (for example the pressure) is linked with an output (request) which is the relative percentage of an actuator, which is able to intervene to modify the quantity to be controlled. We speak of regulation or regulation request, since the calculation has a relative percentage (%) as output, which is then translated according to the actuator according to its characteristics.

A regulation request is identified for an actuator of a device according to the instantaneous value adopted by the controlled variable. A simple regulation requests of the on/off type, that is to say, if a value of a quantity is higher than a set-point, the regulation device is activated. For example, if the device is a compressor, the compressor is switched on if the controlled quantity is greater than the setpoint. The compressor, on the other hand, is switched off when it reaches the setpoint, or is below the setpoint by a certain threshold.

In more advanced systems, so-called dynamic feedback control systems have been developed, such as a regulation of the so-called neutral zone or "dead band".

The logic underlying such a regulation device is to check whether a value of a quantify is within an accepted range of values ("neutral zone"), in which the range is usually centred around, or includes, a reference value or ideal value, also caged the set point.

Inside the neutral zone, the request for actuation on the device to be actuated provided by the regulation is constant and the assumed value is such as to satisfy the request in those particular operating conditions, therefore, as long as it remains inside, no device is switched off or on. The regulation through "neutral zone" also provides for a regulation request in a so-called zone of reduction or decrease of the regulation request, wherein the request decreases with a speed that depends on the value of the measured quantity, and, vice versa, in the increase zone it always increases with a speed proportional to the value of the measured quantify.

For example, the request provided by the regulation decreases/increases slowly as soon as you leave the neutral zone, while it decreases/increases quickly the further you move away from the neutral zone; in this way, the response of the plant is faster when far from equilibrium conditions. In other words, the regulation request can decrease/increase in a constant manner over time outside the neutral zone, or it can vary more slowly as soon as you leave the neutral zone and faster when you move away from the neutral zone depending on the calculation curve of the request selected.

However, it is possible, within the known technology of the regulation by means of a neutral zone, to also provide for the case of several devices, for example of a plurality of compressors of the refrigeration plant, of which one (or some) compressors are modulating. In this case, if the modulating device is switched on, its capacity can be modulated within the neutral zone. In other words, the total request of the entire compressor unit remains fixed in such a way that other devices do not turn on/off, but if possible, the modulating device can be modulated by controlling it inside the neutral zone. The modulation can always be calculated by feedback control or other methods.

Such a regulation is useful in a refrigeration plant in particular both for the control of capacitors and for the control of compressors, or for the control of other actuators such as, for example, valves.

SUMMARY OF THE INVENTION

At the basis of the invention there is a recognition by the inventors of the present patent application that such a type of regulation, although advantageous from many points of view, can be not very efficient, and/or sometimes under certain conditions expose a refrigeration plant to operating conditions with reduced or unsatisfactory safety, especially in a complex system where the variables are many, exposed to numerous dynamic changes and there are several interdependent devices to control.

The invention starts from the position of the technical problem of providing an improved regulation apparatus for a refrigeration plant, an improved regulation method in a refrigeration plant, and a refrigeration plant which includes said improved regulation apparatus with respect to those of the prior art.

This is achieved by means of a regulation apparatus, a regulation method and a refrigeration plant according to the respective independent claims. Secondary features of the invention are defined in the corresponding dependent claims.

At the basis of the invention there is an acknowledgment that regulation, with consequent greater safety of a refrigeration plant, can be better obtained by making a comparison between values of regulation requests in at east two points of a fluid path of the refrigeration plant on the basis of a quantity value in a so-called neutral zone interval, that is to say, starting from a check as to whether or not the quantity value lies, or not, in both the at least two points in a so-called neutral zone interval. This is particularly important in the case of a control of pressures along the fluid path of the refrigeration plant to avoid that by controlling in certain conditions "only" a request linked to a pressure in one point, the other (in the other point) rises too much beyond undesired levels.

The evaluation of the regulation request in the two points of the fluid path can take place by direct measurement of a quantity to be controlled through the respective sensor or probe, or by measuring the quantity to be controlled at one point and deriving the same quantity to be controlled at another point.

The expression "point" refers to a region or zone of the fluid path in the refrigeration plant where a certain quantity can be verified, such as pressure or other quantity.

In accordance with the invention, a regulation apparatus is provided for a refrigeration plant having at east one or more devices of the refrigeration plant, wherein said regulation apparatus includes a first sensor designed to be arranged in a first point (or region) along a fluid path of the refrigeration plant for a measurement of a quantity in said first point, a second sensor designed to be arranged in a second point (or region) along the fluid path of the refrigeration plant for a measurement of said quantity in said second point, or a calculation unit for deriving or calculating said quantity in said second point (without necessarily the second sensor), and a control device.

The control device includes at least one control unit and an actuation unit or device. In said control unit a reference value or set point is stored for the quantity measured by the first sensor, and a reference value or set point for the quantity measured by the second sensor or calculated for the second point, and a first neutral zone around the first reference value and a second neutral zone around the second reference value, wherein a constant regulation is provided in said first neutral zone and second neutral zone and a regulation request is stopped or blocked at a value such as to satisfy specific operating conditions in the refrigeration plant. In said control unit, a regulation reduction or decrease zone is set, within which a regulation request decreases from an output value from the neutral zone, preferably to zero, and a regulation growth or increase zone is set, within which a regulation request increases from the neutral zone output value, preferably to 100%.

Said control unit is also configured to control a first real value measured by said first sensor and check if said first measured value is inside the first neutral zone, of a growth zone or in a zone of reduction or decrease for said first sensor (that is to say, for said first point), and derive a first regulation request of operating parameters of said one or more devices of the refrigeration plant.

Said control unit is further configured to control a value measured by said second sensor or derivative for second point, and to verify whether said value measured by the second sensor or derivative for second point lies within the respective neutral zone, growth zone or reduction or decrease zone for said second sensor and/or for said second point, and derive a second request for regulation of operating parameters of said one or more devices of the refrigeration plant, and wherein said control unit compares the first regulation request (deriving from said first measured value) with the second regulation request (deriving from said second measured or calculated value), establish which regulation request is most suitable and/or most effective for the refrigeration plant between the first regulation request and second regulation, and wherein said control unit is designed to control the actuation device to actuate the most suitable and/or most effective regulation request. The actuation device actuates the device(s) of the plant to be regulated.

Preferably, the most suitable and/or most effective request is a greater regulation request.

The second sensor can be physically present, or it can be absent, and the quantity in the second point can be derived mathematically by means of a suitable calculation using a calculation unit. The computing unit can be part of the control unit. Consequently, the second value of the quantity on which the second regulation request is calculated could derive from a second probe and therefore measured but the case can be included that said second value of the quantity can instead be estimated through a formula, for example with an offset fixed with respect to the value of the first pressure, or as a calculated value knowing the characteristics of valves present in the circuit or fluid path or of the ejector of the circuit or of the activation of low temperature compressors if present, or other similar correlations.

When pressure "measured by the second sensor" is mentioned in the invention, it should also be understood as pressure only derived or calculated appropriately, whether the second sensor is present or not.

It will be understood that the basis of the invention is the intuition to compare regulation requests in two points calculated based on the neutral zone technique and to select the regulation most suitable for a given plant or choose a regulation request value most suited to the needs of the plant.

It is observed that it is evaluated whether the first real value measured by said first sensor, and the second value measured by said second sensor or calculated for said second point are each in the neutral zone or not, and a regulation request is deduced (first regulation request and second regulation request, respectively). Each such regulation request is independent of a deviation of the first value measured for the first point with respect to a respective first reference value, and similarly the regulation request for the second point is independent of a deviation of the second value measured by the second sensor or calculated for the second point with respect to the respective second reference value. In other words, the calculation of a regulation request does not imply that the regulation request is greater if the deviation of the real value is greater with respect to a reference parameter (fixed or defined through a pre-set curve).

It follows that said deviation for each value has no weight on the comparison between the first regulation request and the second regulation request. In other words, in the comparison between regulation requests, it is not evaluated which of the measured or calculated value for the first point and for the second point deviates more from the neutral zone, or from a reference value.

This also happens when the two measured or calculated (real) values are in the neutral zone. In fact, if both the first regulation request and the second regulation request are in the neutral zone, a comparison takes place between the regulation requests (those previously measured at the entry/exit from the neutral zone) and it is not evaluated which of the first real value and the second real or calculated value is closer to the respective reference value, even though it is in the neutral zone. In other words, the initial evaluation to establish whether a real value of the quantity to be calculated is in the neutral zone is a yes/no check. Such evaluation does not require a quantification of a deviation such as to be weighted in a subsequent comparison.

Preferably, as anticipated above, a regulation or regulation request is a calculation that has a relative percentage (%) as output. Consequently, in comparing the first regulation request with the second regulation request, relative percentages (%) are compared. The most suitable and/or most effective percentage (%) is then established and chosen. The most suitable and/or most effective percentage (%) is then translated or transformed into a regulation command suitable for said actuation device.

For example, for some controls, such as the control of a compressor, the greater request is chosen.

It should also be noted that the setpoint values (or reference values) of said quantity for the two points of the fluid path can be fixed or could be variable, for example calculated by the control unit within bands or ranges of predetermined values. Consequently, the neutral zone, which is defined with a differential with respect to the setpoint, could also be variable.

Preferably, the device of the refrigeration plant to be controlled is a compressor or a plurality of compressors. In this case, the regulation request is a percentage linked to the total maximum capacity of the compressors installed. If a 50% request is calculated for one of the two sensors, or in general (if there is only one sensor) for one of the two points, and there are two identical compressors, one would switch on, but if there are four identical compressors installed with the same "request" at 50%, only two would switch on.

In practice, the regulation request can be an overall regulation request for a plurality of devices, that is, for example, of compressors. Among said compressors, one can be a modulating compressor.

If the device of the refrigeration plant to be controlled were a valve, for example, the regulation request % could be the opening of the valve between its maximum and its minimum. In the case of a fan, the fan speed for example. Reference is made below, for simplicity, to the pressure.

At the basis of the invention there is the recognition of comparing in a cyclical manner at predetermined times $t_i$, which can correspond to cycles of a control program, at least two regulation requests for the two sensors, or in general for the two points. The total request is determined by choosing at each instant the greater of the requests for the first sensor and for the second sensor (or for the second point in general).

Preferably, if for one between said first point and second point, the measured or calculated quantity is exiting the neutral zone, and the other in a zone of decrease (reduction) of the request, the request which is in the decrease zone is realigned to the value of a total request calculated in a previous calculation instant, or of the total request calculated at instant $t_{(i-1)}$, that is, at the previous program run, where total request means the final one of a respective calculation algorithm, that is, the greater of the two of the previous program run. A similar regulation also takes place, if for one of said first sensor and second sensor (or second point), the measured or calculated quantity is exiting the neutral zone and the other is in a request growth zone, the request that is found in the growth zone is realigned to the value of a total request calculated in a previous calculation instant.

Preferably, in the request reduction zone, for each of the two sensors or for each of the two points the request is decreased with a linear trend ranging from a % percentage value corresponding to that of the neutral zone down to 0%. In the request growth zone, for each of the two sensors or for each of the two points the request is increased with a linear trend ranging from a % percentage value corresponding to that of the neutral zone up to 100%.

It should be understood that the trend could be non-linear and of another type (for example, exponential).

Various methods can be used to calculate the request increase/decrease curves outside the neutral zone, for example, a first method is a fixed time method, and a second method is a variable time method.

In both cases, four time parameters and two difference or delta pressure parameters are set:

Max time decrease [sec]
Min time decrease [sec]
Max Time increase [sec]
Min Time increase [sec]
Decrease Differential [barg]: delta or pressure difference outside the neutral zone to arrive at the Min time decrease value.
Increase Differential [barg]: delta or pressure difference outside the neutral zone to arrive at the Min time increase value.

For the two sensors, or in general the two points of the fluid path (if only one sensor is present), distinct pressure differentials and common times can be provided, or alternatively also distinct times with any appropriate parameters that can be derived by a person skilled in the art according to the plant to be regulated. Through these parameters, in fact, straight lines are defined which relate the pressure with a time in seconds.

When leaving the neutral zone, a counter $t_i$ is activated and is updated cyclically, for example every second incrementally, whilst remaining outside the neutral zone.

The request at every second $t_i$ can be calculated with the following two formulas depending on whether it is in the decrease or reduction zone (Req_decrease) or in the increase or growth zone (Req_increase).

$$Req_{decrease} = Req_{outNZ} - \frac{100}{Time_{decrease}} * t_i$$

$$Req_{increase} = Req_{outNZ} - \frac{100}{Time\_increase} * t_i$$

Where:
$Req_{decrease}$⊚$Req_{increase}$ [%]: is the % of request at the moment $t_i$ in which it is calculated (every second).
$Req_{outNZ}$ [%]: is the % of request, which occurred when, leaving the neutral zone
Time_decrease⊚Time_increase[sec]: is the time calculated according to the parameters previously set, depending on whether they are fixed or variable times.
$t_i$ [sec]: time elapsed since exiting the neutral zone It is to be understood that for the calculation of the regulation request with the neutral zone method, other types of calculation can also be envisaged, all within the reach of the person skilled in the art and which depend, as mentioned, on the plant to be regulated.

According to an embodiment, the refrigeration plant comprises at least one evaporator, also called a freezer, and a compressor located downstream of the evaporator in a refrigerant fluid path of the refrigeration plant. The plant further includes a heat exchanger and a receiver interposed in order between the compressor and the evaporator, in the receiver, the liquid part is separated from the gaseous part of the refrigerant fluid. The receiver is also connected directly to the compressor, or indirectly, for example via a lamination valve or flash gas valve, to send the gaseous part to the compressor under certain conditions, especially when the external environmental conditions are of high temperatures.

An ejector is placed between the heat exchanger and the receiver and is configured to be connected to the evaporator. The heat exchanger is connected to a primary inlet of the ejector. The evaporator is connected to a secondary inlet of the ejector. The gaseous refrigerant leaving the evaporator can then be introduced into the secondary inlet of the ejector.

Preferably, a check valve is interposed between the evaporator and the compressor to avoid backflow from the compressors to the evaporator in particular operating conditions, and, preferably again, a check valve is interposed between the evaporator and the secondary inlet of the ejector. In said refrigeration plant, the first sensor is placed downstream of the evaporator to measure a pressure of the gas leaving the evaporator, preferably upstream of the check valve, and the second sensor or in general the second point (if the second sensor is absent) is placed upstream of the compressor, preferably downstream of the check valve, to measure or calculate a gas pressure under suction conditions by the compressor.

It is to be understood that the check valve is a member which has a flow blocking function in the opposite direction to that desired as a preferential one. The check valve is used to block a counter flow if the downstream pressure is greater than the upstream one. This can happen due to other causes of operation of the plant (ejector, start-up of low temperature compressors, etc.). Such valves usually act mechanically autonomously without any regulation.

The first regulation or first regulation request is a regulation request calculated downstream of the evaporator while the second regulation or second regulation request is a regulation request calculated upstream of the compressor. Based on the calculated regulation requests, it is verified which request is greater and consequently the compressor capacity is acted upon.

The device of the refrigeration plant to be actuated is therefore, as mentioned above, and specifically according to this embodiment, a compressor.

The regulation apparatus and the method according to the invention envisage, as mentioned, comparing the two requests and selecting the greater of the two requests, as the total request with which to actuate the compressor.

The control and comparison between the two regulation requests is continuously carried out over time, in order to regulate the operation of the compressor in feedback on the basis of the value of the greater request. It must be understood that the reference quantity for the regulation request may mean both the pressure and the temperature converted or read by the probe in the absence of the pressure probe, even if reference is made below only to the pressure.

For example, in this case, assuming that for both the sensors or in general for both the points, the measured or calculated value is in the zone of reduction or decrease of the request, the greater request is selected and consequently the compressors are actuated (or if allowed, some compressors are switched off/on); in doing so the pressure tends to increase. If, for example, the compressors are decelerated (and/or switched off in the case of several compressors) the pressure tends to increase.

It is possible to reach a request value % with a predetermined pressure so that for one of the two sensors/points or for both the sensors/points it returns to the neutral zone. In other words, according to the embodiment example discussed here, the greatest request is always and, in any case, selected whatever the zone and obviously even if the two requests are in different zones. In the growth zone if for example the compressors accelerate the pressure drops.

If for both the sensors/points it is in the neutral zone, the request values are nevertheless compared, and the greater one is selected to activate the compressors.

Further advantages, characteristics and methods of use of the object of the invention will become evident from the following detailed description of its embodiments, presented merely by way of non-limiting examples.

It is however evident that each embodiment of the object of this disclosure can have one or more of the advantages listed above; however, no embodiment is required to simultaneously have all the listed advantages.

BRIEF DESCRIPTION OF THE DRAWINGS

Reference will be made to the accompanying drawings, wherein.

DETAILED DESCRIPTION OF THE INVENTION

Figure 1:
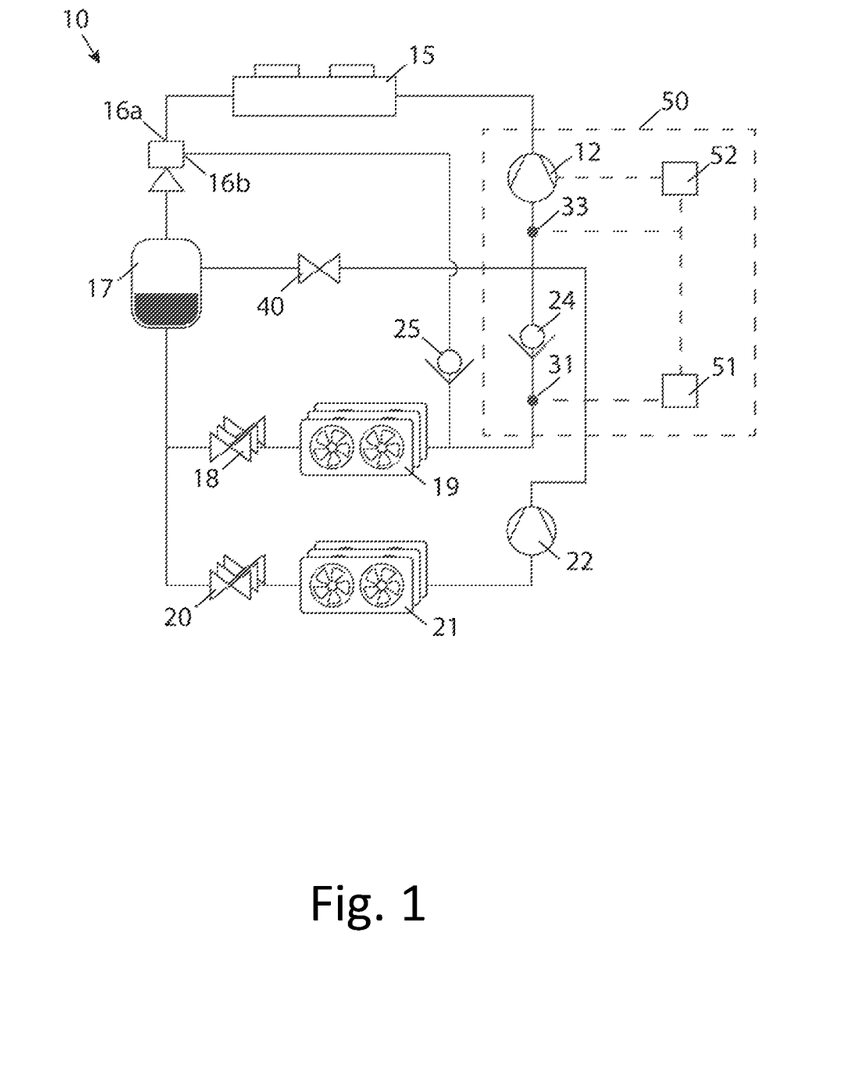
FIG. 1 shows a view of a diagram representing a refrigeration plant with regulation apparatus according to an embodiment of the invention.

With reference to the accompanying drawings, the numeral 10 denotes a refrigeration plant. The refrigeration plant 10 comprises, connected in fluid communication in a circuit, a compression device 12 or compressor, a heat exchanger 15, an ejector 16, a receiver 17, an expansion valve 18 and an evaporator 19. The compression plant 10 preferably includes in the embodiment shown at least a second expander 20 and a second evaporator 21 and a further compression device 22 to serve users at a low temperature with respect to the first above-mentioned components. Further expanders, evaporators and compression devices may be provided without departing from the scope of the invention.

In such a refrigeration plant 10, a fluid leaving the compression device 12 enters the heat exchanger 15 where it is cooled. The fluid leaving the heat exchanger 15 is introduced into a first inlet 16a in the ejector 16. An output of the ejector is normally connected to the receiver 17, where a liquid part of the fluid is separated from the gaseous part. The liquid part of the fluid is supplied to the evaporator 19, passing through the expander 18. The gaseous part of the refrigerant can be supplied to the compression device 12, as will described in more below. A further connection is provided between the evaporator 19 and a second inlet 16b of the ejector 16.

A first check valve 24 is preferably provided interposed between the evaporator 19 and the compression device 12, and a second check valve 25 is interposed between the evaporator 19 and the second inlet 16b of the ejector 16.

It will be noted that a fluid path is identified in the above-mentioned circuit which runs from the compression device 12 towards the receiver 17 passing through the heat exchanger 15 and the ejector 16, and which continues from the receiver 17 towards the compression device 12 passing through the expander 18 and the evaporator 19. A further fluid path is provided between the evaporator 19 and the ejector 16 passing through a respective check valve 25. With respect to said fluid paths, a downstream position and an upstream position for each component of the plant are identified in the circuit and in the plant. In other words, for each device of the refrigeration plant, a position upstream and downstream with respect to the path of the fluid in the region of the device is identified (and must be understood).

Therefore, for example, the ejector 16 is in a downstream position with respect to the heat exchanger 15 and the ejector 16 can be considered in a position upstream of the evaporator for the liquid part of the fluid, but downstream of the evaporator for a gaseous part that arrives from the evaporator passing through the check valve.

As is known, an ejector uses the Venturi effect to increase the pressure of the gaseous part at the second inlet by means of the fluid arriving at the first inlet.

Furthermore, the plant 10 includes a first probe 31 at the outlet from the evaporator 19, for example positioned upstream of the first check valve 24, and a second probe 33 positioned upstream of the compression device 12. In practice, the check valve 24 separates the outset from the evaporator 19, for example a so-called medium temperature evaporator, from the inlet of the compression device 12. It will be noted that the first probe 31 is able to identify a pressure p1, which is the pressure at the outlet of the medium temperature evaporators, upstream of the first check valve 24. The second probe 33 is able to identify a pressure p3, that is to say the suction pressure at the compression device 12.

The first probe 31 and the second probe 33 are also part of a regulation apparatus 50, including a control unit 51 (or regulation unit) operatively connected to the first probe 31 and to the second probe 33. The regulation apparatus 50 further includes an actuation device 52 operatively connected to the processing unit 51 and to the compression device 12 or compressor 12 to actuate the compressor on the basis of inputs received from the control unit 51. It should be noted that the second probe 33 may be absent or not used to measure the pressure. In this case, a pressure can be derived in the area of the second probe 33 (corresponding to a so-called second point) by deriving a calculated value, for example but not exclusively from the value of the pressure measured by the first probe 31, or from other characteristics of the plant, such as plant actuators. Where the second probe 33 is described, it must be understood implicitly that this probe could be absent and the relative pressure value is derived or calculated without direct measurement.

According to an aspect of the invention, in order to optimize an operation of the plant 10, a calculation is made of a request for regulation of the compression device 12 both on the basis of a pressure value measured by the first probe 31 and on the basis of a pressure value measured by the second probe 33, or derivative.

A system is therefore provided for calculating a first regulation request based on the pressure value measured at the point of the first probe 31, and for calculating a second regulation request on the basis of the measured pressure value or, as mentioned, derived in the point of the second probe 33. The two regulation requests are compared and the greater regulation request is chosen as the total regulation request of the compression device 12.

In other words, a so-called comparison of regulation requests is performed on the basis of the pressure value measured upstream of the first check valve 24 and of the pressure value measured downstream of the first check valve 24 and therefore upstream of the compression device 12. In other words, a pressure reading p1, p3 is taken and, for each respective position in the circuit, a regulation request value is calculated, that is, a calculation of a regulation request to operate the system in conditions of optimization for the position of the first probe 31 and of the second probe 33.

It follows that for each sensor or probe 31, 33, a regulation request occurs, that is, how much, for example., in percentage terms, a plant heeds to be regulated to reach a reference value,, in the area of the first probe, and in the area of the second probe respectively. The greater request is chosen as the total request with which to actuate the compression device.

Even more precisely, a better regulation of a refrigeration plant 10 can be better obtained by making a comparison between the values of regulation requests in the two points of the fluid path of the refrigeration plant 10, corresponding to the sensors 31 and 33 starting from a verification of whether the measured pressure quantity value lies in a so-called neutral zone range.

The above-mentioned regulation apparatus 50 is therefore provided including the control unit 51 where a reference value or set point is stored for the quantity measured by the first sensor 31, and a reference value or set point for the quantity measured by the second sensor 33, or derived. A first neutral zone around the first reference value and a second neutral zone around the second reference value are also stored. In the first neutral zone and in the second neutral zone, a regulation request is stopped or blocked at a value such as to satisfy specific operating conditions in the refrigeration plant 10.

In the control unit 51, a regulation reduction or decrease zone is set, within which a regulation request decreases from an output value from the neutral zone, preferably to zero, and a regulation growth or increase zone is set, within which a regulation request increases from the neutral zone output value, preferably to 100%. The control unit is also configured to check a first real value measured by said first sensor 31 and check if said first measured value is inside the first neutral zone, of a growth zone or in a zone of reduction for said first sensor, and derive a first regulation request of operating parameters of said one or more devices of the refrigeration plant.

The control unit 51 is also configured to check a value measured by said second sensor 33 (or derived for said second point) and check whether said value measured by second sensor 33, or calculated for said second point P3, is located within the respective neutral zone, growth zone or decrease zone for said second sensor/point, and derive a second regulation request of operating parameters of the compressor 12 of the refrigeration plant 10.

More specifically, the control unit 51 is configured to compare the first regulation request on the first sensor with the regulation request on said second sensor 33 or on said second point P3, establishing which regulation request is greater between the first regulation request and the second regulation request. The control unit is configured to command the actuation device 52 to actuate the greater regulation request on the compressor 12.

Figure 3:
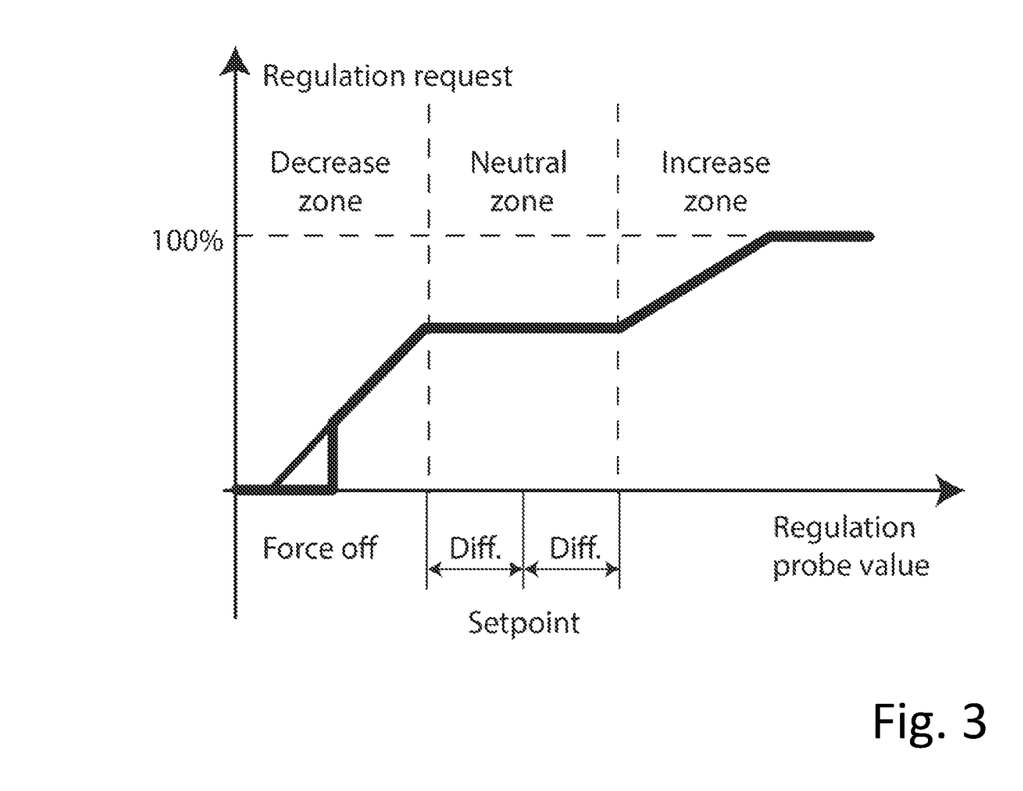
FIGS. 3 and 4 show views of graphs relative to the regulation requests according to respective modes of the neutral zone.

More particularly with reference to FIG. 3, the regulation can be carried out based on a so-called neutral zone technique with fixed times. For this reason, for each sensor 31, 33, in addition to neutral zone intervals, growth times and decrease times are established:

Max time decrease [sec]=Min time decrease [sec]=Time_decrease

Max Time increase [sec]=Min Time increase [sec]=Time_increase

The times between decrease and increase do not necessarily have to be the same.

In this way, a fixed time is in fact obtained, equal to the one set in seconds.

Therefore, outside the neutral band, the request varies constantly over time by a % every second with the following formula.

$$Req_{decrease} = Req_{outNZ} - \frac{100}{Time_{decrease}} * t_i$$

$$Req_{increase} = Req_{outNZ} - \frac{100}{Time\ increase} * t_i$$

Example:
Time_decrease=180 sec
$Req_{outNZ}$=40%
$t_1$ (1 second after exiting the neutral zone)

$Req_{decrease}$=40−100/180*1=39,45

$t_2$ (2 seconds after exiting the neutral zone)

$Req_{decrease}$=40−100/180*2=38,9

And so, on ultimately the request decreases by 100/180=0.55% every second.

Figure 4:
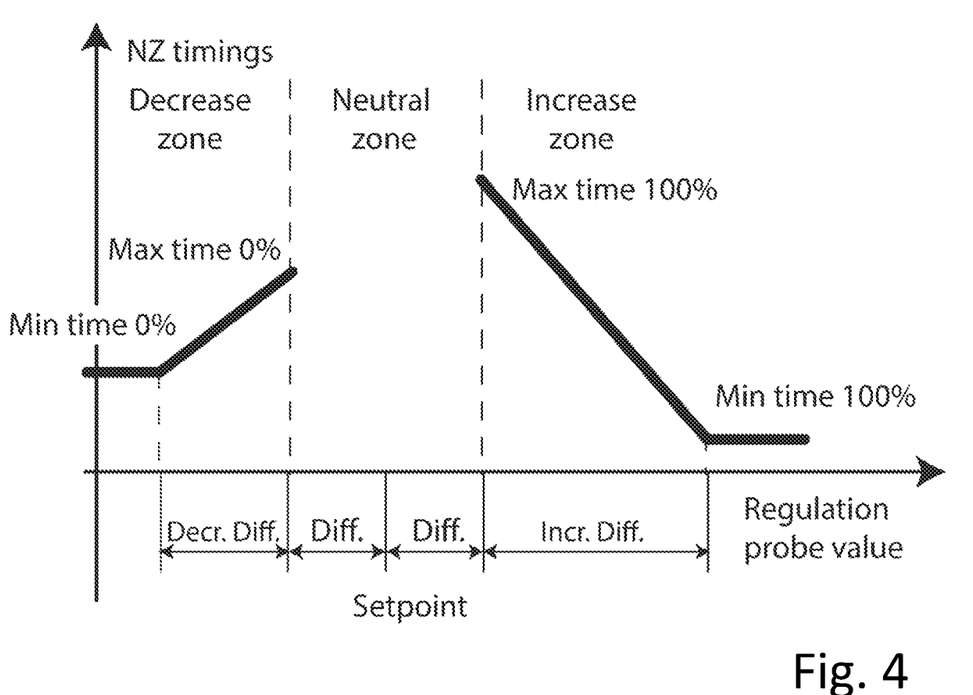

The effect of the decrease of the request will be a deceleration of the compressors 12 which will therefore tend to increase the working pressure and then return within the neutral zone (not necessarily at the same percentage at which it was exited), Alternatively, with reference to FIG. 4, the regulation can be carded out based on a so-called neutral zone technique with variable times.

In this case, by setting all the time parameters and pressure differentials previously described, the two times Time_decrease and Time_increase are no longer constant but are recalculated at each time $t_i$ (every second). They are therefore a function of the pressure read at the same instant $t_i$ with a trend such as to obtain straight lines according to the following formulas.

Time_decrease$_i = p_i *$m_decrease$_i +q$_decrease$_i$

Time_increase$_i = p_i *$m_increase$_i +q$_increase$_i$

With:

$$m\_decrease_i = \frac{(Max\_time_{decrease} - Min\_time_{decrease})}{Diff_{decrease}}$$

$$q\_decrease_i = \frac{((p_{set} - Diff) * Min\_time_{decrease} - (p_{set} - Diff - Diff_{decrease}) * Max\_time_{decrease})}{Diff_{decrease}}$$

$$m\_increase_i = \frac{(Min\_time_{increase} - Max\_time_{increase})}{Diff_{increase}}$$

$$q\_increase_i = \frac{((p_{set} - Diff + Diff_{increase}) * Max\_time_{increase} - (p_{set} - Diff) * Min\_time_{increase})}{Diff_{increase}}$$

In this way the request decreases (or increases) slowly as soon as you leave the neutral zone, for pressure values close to the neutral zone itself, whilst it decreases (or increases) quickly away from the neutral zone.

Time_increase$_i$ and Time_decrease$_i$ calculated can be limited to the maximum and minimum values set in the control and used for the calculation itself (that is, limited respectively to Max_time$_{increase}$ Min_time$_{increase}$ Max_time$_{decrease}$ Min_time$_{decrease}$)

Example:
Max_time$_{decrease}$=120 sec
Min_time$_{decrease}$=60 sec
Diff=2 barg
Diff$_{decrease}$=2 barg
Req$_{outNZ}$=40%
Setpoint=26 barg
$p_1$=23.9 barg (just out of the neutral zone below)
$p_2$=23.5 barg
$p_3$=23 barg $$m\_decrease_1 = \frac{(120 - 60)}{2} = 30$$

$$q\_decrease_1 = \frac{((26 - 2) * 60 - (26 - 2 - 2) * 120)}{2} = -600$$

$t_1$ (1 second after exiting the neutral zone)

Time_decrease$_1$=23.9*30−600=117 sec

Req$_{decrease1}$=40−100/117*1=39.15

$t_2$ (2 seconds after exiting the neutral zone)

Time_decrease$_2$=23.5*30−600=105 sec

Req$_{decrease2}$=40−100/105*2=38.00

$t_3$ (3 seconds after exiting the neutral zone)

Time_decrease$_3$=23*30−600=190 sec

Req$_{decrease3}$=40−100/90*3=36.66

Figure 2:
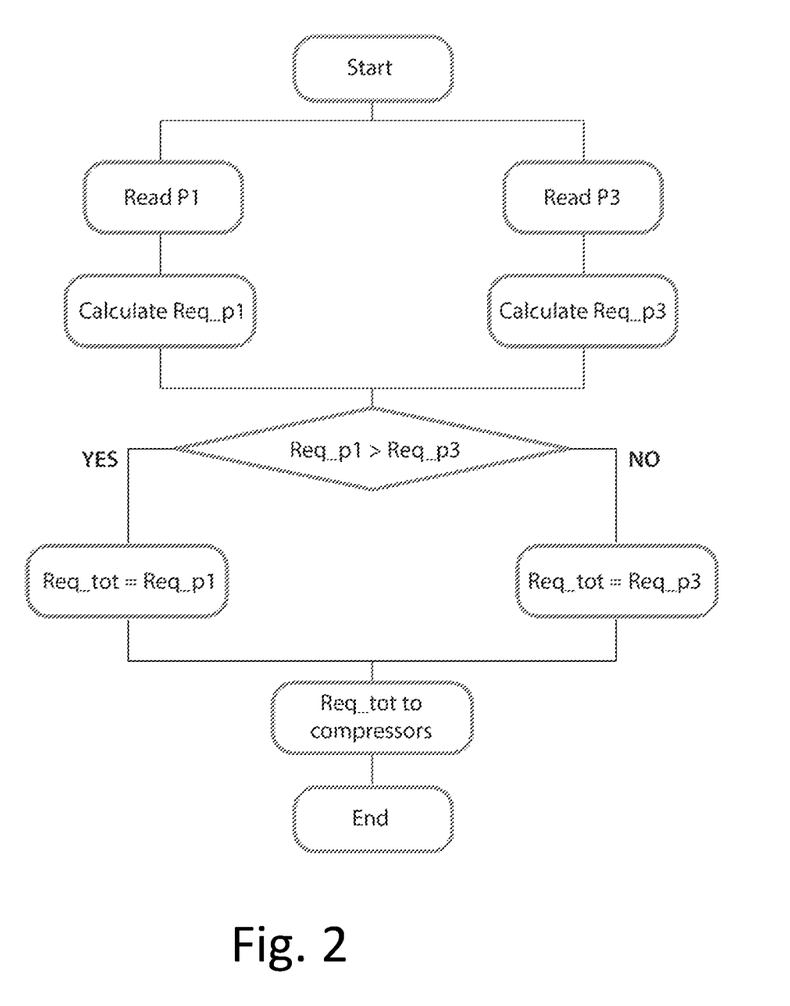
FIG. 2 shows a view of a block diagram representing a method for regulation of a refrigeration plant according to an embodiment of the invention.

As shown in the diagram in FIG. 2, the two requests Req_p1 and Req_p3 are compared and the greater of the two is chosen as the total request with which to actuate the compression device 12.

It should also be noted that request calculation techniques according to the neutral zone mode described here can also be applied to a single sensor. For example, the calculation techniques can be applied in more standard refrigeration cycles, for example without an ejector, where it is necessary to calculate the feedback request on a quantity to be controlled, such as, for example, but not exclusively, the pressure control for the management of compressors in a simple refrigeration cycle.

Figure 6:
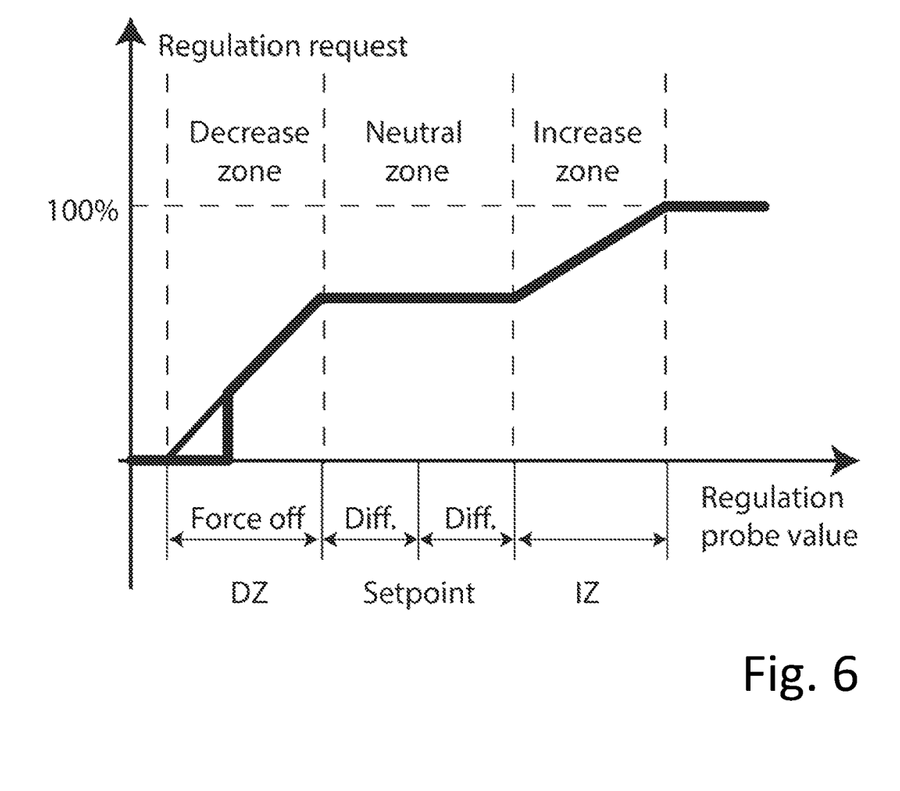
FIG. 6 shows a view of a graph relative to a regulation request according to another mode of the neutral zone.

For example, another calculation method is as follows with reference to FIG. 6.

Three zones are defined:
Decrease zone: wherein the total request Req decreases from the output value from the neutral zone to zero
Increase zone: wherein the request is increased by the output value from the neutral zone up to 100%.
Neutral zone: an intermediate neutral zone in which the request is blocked. The request is blocked at the value it is at when it enters the zone, so it is not a fixed value, but the % of request in the neutral zone can vary from time to time.
The neutral zone is defined by the "Diff" parameter, which can be set in barg, and is the zone between "Setpoint+Diff" and "Setpoint−Diff".

At each run of the program, the pressure is checked $p_i$ to determine which of the three zones are involved and the request is then calculated as described below according to the involved zone.

The following parameters are defined:
Setpoint [barg]
Diff: differential [barg]
DZ: decrease zone differential [barg]
IZ: increase zone differential [barg]

3 bands are therefore created where at the pressure (set−diff+IZ) the request always corresponds to 100% whilst at the pressure (set+diff−IZ) the request always corresponds to 0%.

The request in each of those DZ or IZ zones can be calculated with the formulas:

$$\text{Req}_{DZ_i} = p_i * m\_DZ + q\_DZ$$

$$\text{Req}_{IZ_i} = p_i * m\_IZ + q\_IZ$$

Where:
$\text{Req}_{DZ} \otimes \text{Req}_{IZ}[\%]$: is the % of request at the moment $t_i$ in which it is calculated (every second),
$\text{Req}_{outNZ}[\%]$: is the % of request, which occurred when, leaving the neutral zone
$p_i$ [barg]: is the pressure read at instant i of the calculation
With:

$$m\_DZ = \frac{Req_{outNZ}}{DZ}$$

$$q\_DZ = \frac{-Req_{outNZ} * (p_{set} - Diff - DZ)}{DZ}$$

$$m\_IZ = \frac{100 - Req_{outNZ}}{IZ}$$

$$q\_IZ = \frac{Req_{outNZ} * (p_{set} + Diff + IZ) - 100 * (p_{set} + Diff)}{IZ}$$

Similarly, to the other calculation techniques, the two curves in the decrease and increase zones are described here as straight lines but they could similarly (with different equations) be hyperbolas or exponentials.

Conceptually, differentials are defined to select a fixed point in barg at which the request reaches 100% or 0%. The slope of the straight lines depends on the value $\text{Req}_{outNZ}$, which is not fixed but is the last value that the request had in the neutral zone before exiting (whether in the increase or decrease zone). Then, when you return to the neutral zone, the request value that remains fixed could be different from the previous one and will be the new value assumed in the calculation when you exit dynamically; even though the values remain fixed at 100% and 0%.

It is to be understood that other calculation techniques can be envisaged starting from the concepts-principles described here.

In any case, what is relevant for the invention concerns a comparison between requests, that is to say, a comparison between the regulation requests and the selection of a maximum regulation request or a most suitable regulation request for said refrigeration plant. In other words, the invention does relate specifically to a calculation algorithm per se of the neutral zone or of another algorithm, that calculates the two requests, but the comparison between requests calculated based on said calculation algorithm.

Figure 5:
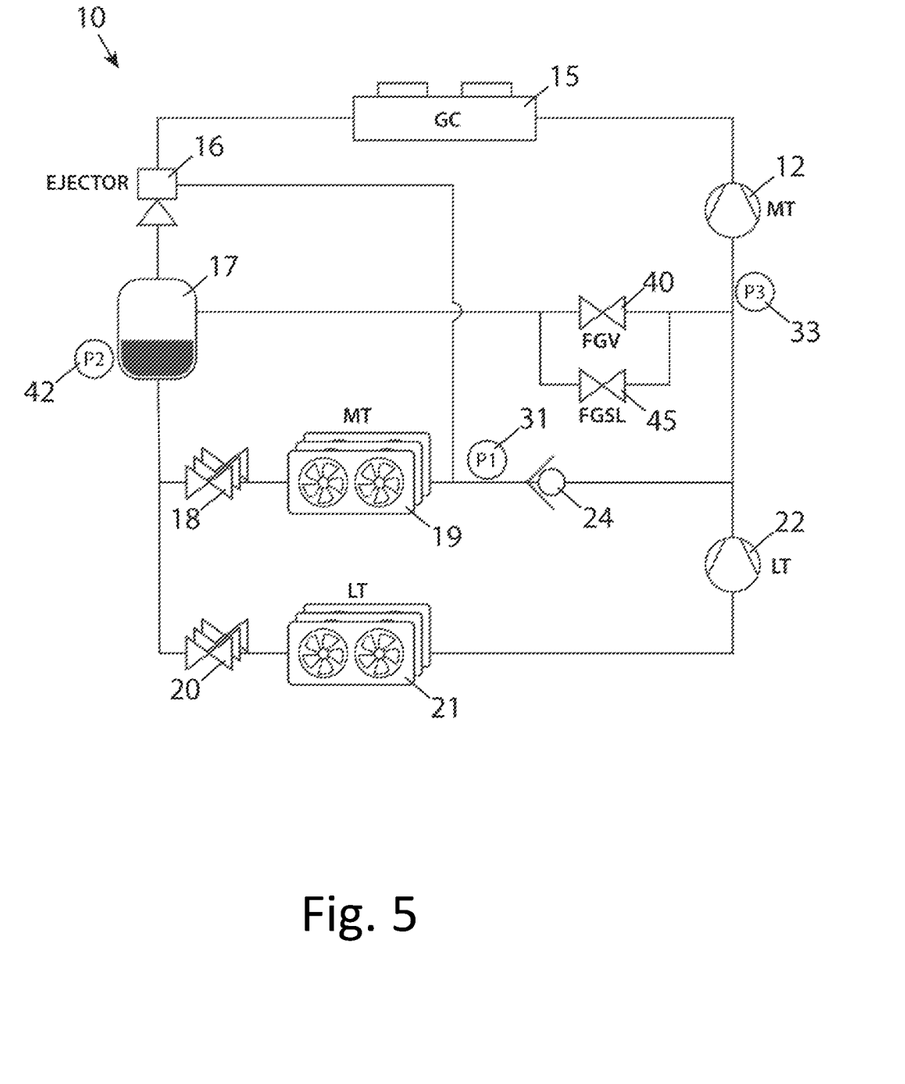
FIG. 5 shows a view of a diagram representing a refrigeration plant according to an alternative embodiment of the invention.

FIG. 5 illustrates a further refrigeration plant 10 with regulation apparatus according to an alternative embodiment of the invention. For this alternative embodiment, components having an identical function retain the same reference numerals.

In particular, with reference to FIG. 5, a refrigeration plant 10 includes a flash gas valve 40 for the interception of gas coming from the receiver 17. At the flash gas valve 40, which is also called a modulating valve, a third probe or third sensor is provided, denoted with reference numeral 42, which is capable of measuring a pressure P2 at the receiver 17.

In particular, when the ejector 16 is able to suck gas from the evaporator and therefore the first check valve 24 between the second sensor 33 and the first sensor 31 is closed (it does not allow the flow from the point of the second sensor 33 towards the point of the first sensor 31), in this case, except for the pressure drops, the pressure at the third probe 42 can be approximately equal to the pressure of the second sensor 33, that is to say, P2 is approximately equal to P3. Preferably, there is additionally an on-off (open/closed) type flash gas solenoid valve 45 installed in parallel with the flash gas valve 40 and with the same function, but to increase the passage area and reduce head losses due to the flash gas valve 40.

The flash gas valve 40 is managed with a conventional regulation called PID (Proportional+Integral+Derivative), calculated on a reference Delta called Delta_set, which can be set, compared with the Delta difference evaluated at each program run.

The Delta can be defined (as a user choice setting) as:

Delta=p2−p1 (with p1 value evaluated/measured at each program run)

Or

Delta=p2−p1_set (that is, comparing p2 not with the actual value of p1 but with the setpoint set for p1).

The aim is to keep Delta preferably within values that balance the optimal operation of the ejector 16 between its capacity to create a pressure increase (lift defined as p2−p1) and the flow rate drawn by the evaporator 19.

Example Delta_set=3 bar (value that can be set by a user), at each program run the Delta difference is evaluated and consequently the PID regulation request of the flash gas valve 40 is calculated to reach the set Delta_set; if Delta>delta_set the valve opens, if Delta<Delta_set the valve closes.

The pressure p1 is typically measured by a transducer. The pressure p2 of the receiver can be measured by means of a transducer or derived from other known quantities as mentioned above in general for a measurement of pressure in the refrigeration plant; for example if in the summer operation the ejector 16 is able to suck the flow rate from the evaporator (from p1) generating an increase in pressure between p1 and p2 such as to close the check valve 24 which separates p1 from p3, in this case p2 is approximately equal to p3 less the pressure drops, so in this operation it is possible to deduce p2 from p3 with any offset.

In another sense, one of the characteristics of the ejector is the lift defined as the pressure difference p2−p1 that it is able to generate. Knowing the performance characteristic curve of the ejector 16, p2 could be obtained by adding to p1 the lift generated by the ejector itself, knowing its operating conditions at the instant evaluated, for example.

In practice, in addition to a comparison between the regulation requests for the first sensor and for the second sensor, there is also a specific management of the flash gas valve 40, which connects the receiver 17 with the suction of the compression device 12. This management is based on the pressures p1 and p2, where p2 is the pressure of the receiver 17.

In use, the gas which is discharged from the receiver 17 towards the suction of the compression device 12 through this flash gas valve 40, can itself influence the trend of the pressure p3. Furthermore, this adjustment of the flash gas valve 42 has the aim of optimizing the delta pressure between p2 and p1 to make the ejector 16 work at its best, and therefore influencing the ejector will also indirectly influence p1 and p3 as trends in the machine.

As mentioned above, a flash gas solenoid valve 45 (FGSL) can be installed in parallel to the flash gas valve 42, therefore with non-modulating operation but completely open or closed.

In this case, a logic such as the following can be actuated:

If the opening of FGV >x % (where x % is a parameter which can be set, for example 90%) then after a certain delay time t in which FGV opening remains >x %, the opening of the FGSL valve is commanded. This valve can manage more flow with less pressure drops thus ensuring a rapid decrease of the Delta p2−p1 and at the same time leaving the FGV valve in parallel to regulate more finely.

If, on the other hand, the opening of the FGV valve falls below a threshold y % (where y % can be set and y % <x %, for example 70%) then, after a certain settable delay time t2, the FGSL valve is closed and only the FGV valve is regulated.

The invention, described according to preferred embodiments, allows the set aims and objectives to be achieved for overcoming the limits of the prior art.

The invention has thus far been described with reference to its embodiments. It is to be understood that there may be other embodiments pertaining to the same inventive core, all falling within the scope of protection of the claims set forth below.

The invention claimed is:

1. A regulation apparatus for a refrigeration plant, wherein at least one refrigerating fluid path is defined in the refrigeration plant and at least one compressor, at least one capacitor, at least one valve or ejector, or at least one fan, are arranged along said refrigerating fluid path, wherein said regulation apparatus includes
a first sensor configured to be arranged in a first point (P1) along the refrigerating fluid path of the refrigeration plant to detect a first value of a quantity in said first point (P1),
a second sensor configured to be arranged in a second point (P3) along the fluid path of the refrigeration plant to detect a second value of said quantity in said second point (P3),
and
an actuator configured to actuate said at least one compressor, at least one capacitor, at least one valve or ejector, or at least one fan of the refrigeration plant, wherein said regulation apparatus is configured to store reference values or set points of said quantity in said first point (P1) and of said quantity in said second point (P3),
wherein said regulation apparatus is further configured to store the reference value or set point for the quantity measured by the first sensor, and the reference value or set point for the quantity measured by the second sensor and said regulation apparatus being further configured to store a first neutral zone, wherein the first neutral zone is a range of values including the first reference value and said regulation apparatus being further configured to store a second neutral zone, wherein the second neutral zone is a range of values including the second reference value,
wherein a constant regulation of said at least one compressor, at least one capacitor, at least one valve or ejector, or at least one fan is provided in said first neutral zone and second neutral zone and a regulation request is stopped or is blocked at a value such as to satisfy specific operating conditions in the refrigeration plant,
wherein said constant regulation determines no regulation request and no need of modifying operating parameters of said at least one compressor, at least one capacitor, at least one valve or ejector, or at least one fan, and
wherein a regulation request is a request of modifying the operating parameters of said at least one compressor, at least one capacitor, at least one valve or ejector, or at least one fan in feedback if the value of said quantity deviates from the respective reference value;
wherein said regulation apparatus is further configured to set a zone of reduction or decrease of the regulation and a zone of growth or increase of the regulation,
said regulation apparatus being further configured to control a first real value detected by said first sensor and check if said first detected value is inside the first neutral zone, in the growth zone or in the zone of reduction or decrease for said first sensor, and calculate a first regulation request (Req_p1) of the operating parameters of said at least one compressor, at least one capacitor, at least one valve or ejector, or at least one fan of the refrigeration plant,
said regulation apparatus being further configured to control a value detected by said second sensor for said second point (P3), and said regulation apparatus being further configured to check whether said value detected by the second sensor for said second point (P3) is located within the respective neutral zone, growth zone or zone of reduction or decrease for said second sensor or for said second point (P3), and
said regulation apparatus being further configured to derive a second regulation request (Req_p3) of the operating parameters of said at least one compressor, at least one capacitor, at least one valve or ejector, or at least one fan of the refrigeration plant, and
wherein said regulation apparatus is further configured to compare the first regulation request (Req_p1) on said first sensor with the second regulation request (Req_p3) on said second sensor, said regulation apparatus is further configured to establish which regulation request improves safety greater for said refrigeration plant, and
wherein said regulation apparatus controls the actuator configured to actuate said improved safety regulation request for said refrigeration plant.

2. The regulation apparatus according to claim 1, wherein the improved safety regulation request is a greater regulation request between the first regulation request and the second regulation request.

3. The regulation apparatus according to claim 1, wherein said at least one or more devices of the refrigeration plant to be controlled is said at least one compressor and the improved safety regulation request is the greater regulation request corresponding to the total capacity of said at least one compressor in the refrigeration plant.

4. The regulation apparatus according to claim 3, wherein each of the first regulation request (Req_p1) and the second regulation request (Req_p3) is a percentage linked to the maximum total capacity of said at least one compressor.

5. The regulation apparatus according to claim 1, wherein said regulation apparatus is further configured to compare in a cyclical manner at predetermined times $t_i$ at least two regulation requests (Req_p1, Req_p3) for the two points (P1, P3) of the fluid path.

6. The regulation apparatus according to claim 1, wherein if for one between said first point (P1) and second point (P3) said quantity is outgoing from the neutral zone, and the other between said first point (P1) and second point (P3) is in a reduction zone or in a growth zone, the regulation request which is in a reduction or growth zone is realigned to the value of a total regulation request calculated in a previous calculation instant.

7. The regulation apparatus according to claim 3, wherein in the reduction zone, for each of the two points the regulation request is decreased by a % value corresponding to that of the neutral zone up to 0% or wherein in the request growth zone, for each of the two points the regulation request is increased from a % value corresponding to that of the neutral zone up to 100%, or if for both the points (P1, P3) it is in the neutral zone, the regulation request values are compared in any case, and the greater one is chosen to actuate the compressor(s).

8. The regulation apparatus according to claim 1, wherein said control unit is configured to calculate both in the reduction or decrease area (Req_decrease) and in the increase or growth area (Req_increase) the request with the following formula:

$$Req_{decrease} = Req_{outNZ} - \frac{100}{Time_{decrease}} * t_i$$

$$Req_{increase} = Req_{outNZ} - \frac{100}{Time\_increase} * t_i$$

Where:
$Req_{decrease}$ ⊚ $Req_{increase}$ [%]: is the % of request at the moment $t_i$ in which it is calculated (every second).
$Req_{outNZ}$ [%]: is the % of request, which occurred when, leaving the neutral zone;
Time_decrease ⊚ Time_increase[sec]: is the time calculated according to previously set parameters and;
$t_i$ [sec]: time elapsed since exiting the neutral zone.

9. The regulation apparatus according to claim 1, wherein the first regulation request (Req_p1) for the first point (P1) is independent of a deviation of the first value detected by the first sensor with respect to the respective first reference value, and said second regulation request (Req_p3) for the second point (P3) is independent of a deviation of the second value detected by the second sensor with respect to the respective second reference value, and consequently a comparison between the first regulation request (Req_p1) and second regulation request (Req_p3) is independent from a comparison between said deviations.

10. Regulating apparatus according to claim 1, wherein said regulation request is a calculation having as output a relative percentage (%), and wherein said comparing the first regulation request with the second regulation request is a step of comparing relative percentages (%), and wherein a percentage (%) that improves safety greater is chosen and translated into a regulation command for said actuator.

11. A refrigeration plant including said at least one compressor, at least one capacitor, at least one valve or ejector, or at least one fan and further including, or in combination with, the regulation apparatus according to claim 1.

12. A refrigeration plant according to claim 11, including said at least one compressor, a heat exchanger, an ejector, a receiver, an expander and an evaporator, wherein said refrigeration plant is configured so that a fluid leaving said at least one compressor enters the heat exchanger and, leaving the heat exchanger, is introduced into a first inlet in the ejector,
wherein an outlet of the ejector is connected to the receiver and wherein said receiver is connected to the evaporator to supply a liquid part of the fluid and is connected to said at least one compressor to supply a gaseous part of the fluid, and
wherein a further connection is provided between the evaporator and a second inlet of the ejector, and wherein a check valve is provided on a connecting section between the evaporator and said at least one compressor, and
wherein said first sensor is placed at the exit of the evaporator and positioned upstream of the check valve and said second point (P3) is upstream of said at least one compressor, downstream of said check valve, and wherein said first sensor is designed to identify a pressure at the exit of the evaporator, before the check valve and wherein said regulation apparatus is configured to identify in said second point (P3) a pressure entering said at least one compressor, and wherein the first regulation request is a regulation request calculated downstream of the evaporator while the second regulation request is a regulation request calculated upstream of said at least one compressor, and
wherein the regulation apparatus is configured to check which request is greater and consequently act on the capacity of said at least one compressor.

13. A refrigeration plant according to claim 12, wherein a second sensor is arranged in said second point (P3).

14. A regulation method for the regulation of a refrigeration plant, wherein at least one path of refrigerant fluid is defined in the refrigeration plant and at least one compressor, at least one capacitor, at least one valve or ejector, or at least one fan arranged along said path of refrigerant fluid, wherein the method provides for
detecting a quantity by means of a first sensor arranged to be arranged at a first point (P1) along the refrigerant fluid path of the refrigeration plant,
detecting a quantity at a second point (P3) along the fluid path of the refrigeration plant;
memorizing
a first reference value or set point for the quantity measured by the first sensor,
a second reference value or set point for the quantity measured by the second sensor or for the quantity in said second point (P3),
a first neutral zone, wherein first neutral zone is a range of values including the first reference value and
a second neutral zone, wherein second neutral zone is a range of values including the second reference value,
wherein a constant regulation is provided in said first neutral zone and in the second neutral zone and a regulation request is stopped or blocked at a value such as to satisfy specific operating conditions in the refrigeration plant,
wherein when regulation is constant there is no regulation request and no need of modifying operating parameters of said at least one compressor, at least one capacitor, at least one valve or ejector, or at least one fan, and wherein a regulation request is a request of modifying the operating parameters of said at least one compressor, at least one capacitor, at least one valve or ejector, or at least one fan in feedback if the value of said quantity deviates from the respective reference value;

setting a regulation reduction or decrease zone and a regulation growth or increase zone for each first point (P1) and second point (P3), controlling a first real value measured by said first sensor and checking if said first measured value is inside the first neutral zone, of the growth zone or in the zone of reduction or decrease for said first point (P1), and deriving a first regulation request (Req_p1) of the operating parameters of said at least one compressor, at least one capacitor, at least one valve or ejector, or at least one fan of the refrigeration plant, determining a second value in said second point (P3) and checking if said second value is within the respective neutral zone, growth zone or zone of reduction or decrease for said second point (P3), and deriving a second regulation request (Req_p3) of the operating parameters of said at least one compressor, at least one capacitor, at least one valve or ejector, or at least one fan of the refrigeration plant, comparing the first regulation request (Req_p1) with the second regulation request (Req_p3), establishing which regulation request (Req_p1, Req_p3) improves safety greater for said refrigeration plant between the first regulation request (Req_p1) and the second regulation (Req_p3), and actuating the improved safety regulation request for the refrigeration plant on said at least one compressor, at least one capacitor, at least one valve or ejector, or at least one fan of the refrigeration plant.

15. The regulation method according to claim 14, wherein said at least one or more devices of the refrigeration plant to be controlled is at least one compressor and the improved safety regulation request (Req_p1, Req_p3) is a greater regulation request corresponding to the total capacity of said one compressor or a plurality of compressors in the refrigeration plant.

16. The regulation method according to claim 15, wherein if for one between said first point (P1) and second point (P3), the quantity measured is exiting the neutral zone, and the other in a zone of reduction or decrease of the request or in a request growth zone, the regulation request (Req_p1, Req_p3) which is in the reduction or decrease zone or in the growth zone is realigned to the value of a total regulation request (Req_p1, Req_p3) calculated in a previous calculation instant.

17. The regulation method according to claim 15, wherein in the zone of reduction or decrease of the request, for each of the two points (P1, P3) the regulation request (Req_p1, Req_p3) is decreased with a trend ranging from a % value corresponding to that of the neutral zone up to 0% or wherein in the request growth zone, for each of the two points the regulation request is increased by a % value corresponding to that of the neutral zone up to 100%, and/or if both points (P1, P3) are in the neutral zone, the request values are compared and the most effective and/or most suitable one is selected.

18. The regulation method according to claim 14, wherein the regulation request is calculated either in the reduction or decrease zone (Req_decrease) or in the increase or growth zone (Req_increase) with the following formula:

$$Req_{decrease} = Req_{outNZ} - \frac{100}{Time_{decrease}} * t_i$$

$$Req_{increase} = Req_{outNZ} - \frac{100}{Time\_increase} * t_i$$

Where:

$Req_{decrease} \circledcirc Req_{increase}$ [%]: is the % of request at the moment $t_i$ in which it is calculated (every second);

$Req_{outNZ}$ [%]: is the % of request, which occurred when, leaving the neutral zone Time_decrease ⊚ Time_increase[sec]: is the time calculated according to previously set parameters;

$t_i$ [sec]: time elapsed since exiting the neutral zone.

19. The regulation method according to claim 14, wherein the plant includes said at least one compressor, a heat exchanger, an ejector, a receiver, an expander, and an evaporator, wherein said plant is configured so that a fluid leaving said at least one compressor enters the heat exchanger and, leaving the heat exchanger, is fed into a first input in the ejector, and in which an output of the ejector is connected to the receiver, and wherein said receiver is connected to the evaporator to supply a liquid part of the fluid and is connected to the compression to said at least one compressor to supply a gaseous part of the fluid, wherein a further connection is provided between the evaporator and a second inlet of the ejector, and wherein a check valve is provided on a connecting section between the evaporator and said at least one compressor, and wherein said first sensor is pieced at the exit of the evaporator positioned upstream of the check valve and said second point (P3) is upstream of said at least one compressor, downstream of said check valve, and wherein said first sensor is configured to identify a pressure at the exit of the evaporator, before the check valve and wherein a pressure entering said at least one compressor is identified, and wherein the first regulation request is a regulation request calculated downstream of the evaporator while the second regulation request is a regulation request calculated upstream of the compressor, and wherein it is verified which request is greater and consequently the capacity of said at least one compressor is acted upon.

20. The regulation method according to claim 14, wherein each first regulation request (Req_p1) and second regulation request (Req_p3) are derived and compared continuously over time, so as to regulate the operation of said one or more devices based on the value of the greater request.

21. The regulation method according to claim 19, wherein the refrigeration plant includes a flash gas valve for the interception of gas coming from the receiver towards said at least one compressor, wherein a third probe or third sensor is provided, configured to measure a pressure (P2) at the receiver, wherein a pressure difference is measured between the pressure at the third probe with respect to the first probe, or with respect to a reference pressure value at the first probe, and the method provides for calculating a regulation request on the flash gas valve and acting on the flash valve gas to maintain said pressure difference within a predefined range and wherein in said second point (P3) a second probe or second sensor is provided for measuring the quantity in said second point (P3).

22. The regulation method according to claim 14, wherein the first regulation request (Req_p1) for the first point (P1) is independent of a deviation of the first real value (P1) with respect to the respective first reference value, and said second regulation request (Req_p3) for the second point (P3) is independent of a deviation of the second value measured by the second sensor or calculated for the second point (P3) with respect to a respective second reference value, and consequently a comparison between the first regulation request (Req_p1) and second regulation request (Req_p3) is independent of a comparison between said deviations.

23. The regulation method according to claim 14, wherein said first regulation request (Req_p1) does not vary proportionally on the basis of a deviation of the first real value with respect to the first reference value and said second regulation request (Req_p3) does not vary proportionally on the basis of a deviation of the second value with respect to the second reference value.

24. The regulation method according to claim 14, wherein said regulation request is a calculation having as output a relative percentage (%), and wherein comparing the first regulation request with the second regulation request is a step of comparing relative percentages (%), and wherein a percentage (%) that improves safety greater is chosen and translated into a regulation command.

* * * * *